Figure 1:
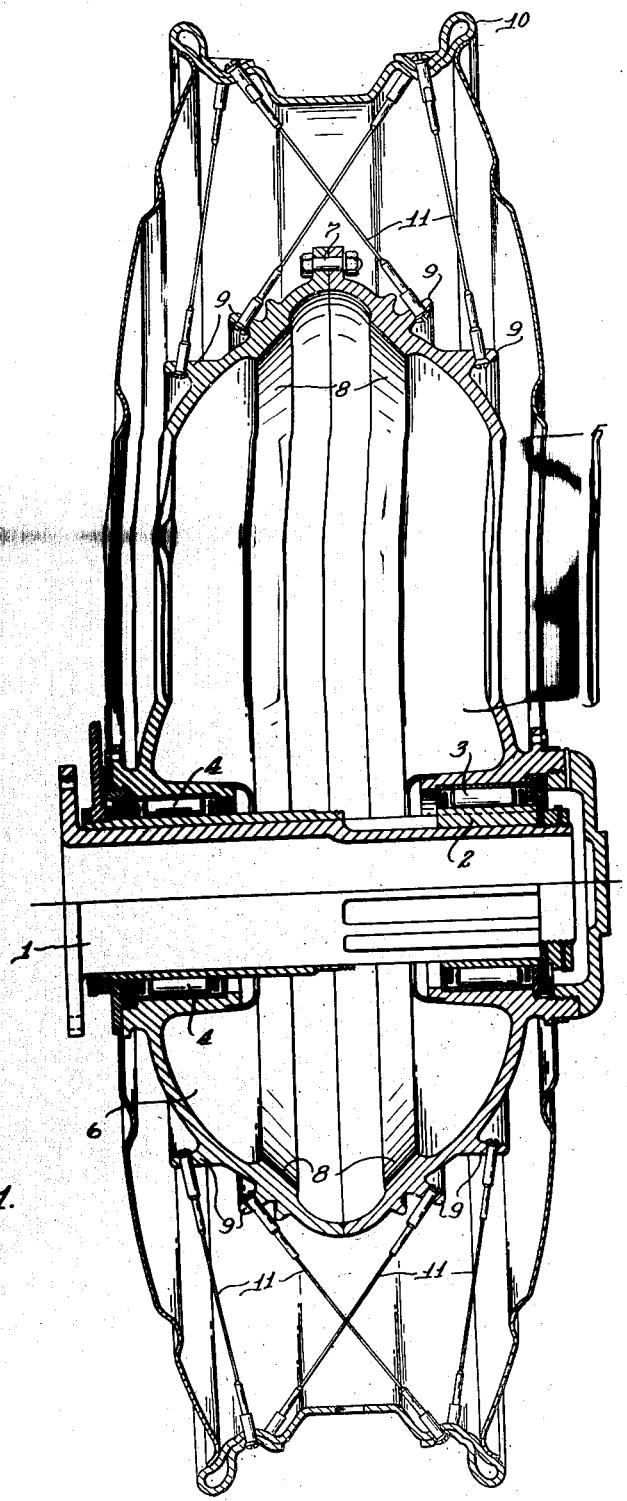

April 21, 1936.  C. SAUZEDDE  2,037,741

WHEEL HUB

Filed Nov. 3, 1932  2 Sheets-Sheet 1

INVENTOR
Claude Sauzedde
BY

Patented Apr. 21, 1936

2,037,741

UNITED STATES PATENT OFFICE 2,037,741

WHEEL HUB

Claude Sauzedde, Detroit, Mich., assignor to Detroit Hydrostatic Brake Corporation, Detroit, Mich., a corporation of Michigan Application November 3, 1932, Serial No. 640,954

6 Claims. (Cl. 301—6)

The present invention relates to wheels of a type particularly adapted for use on automotive vehicles and aircraft.

The primary object of the present invention is to provide a wheel hub comprising a pair of sections formed with angularly disposed annular surfaces adapted to be bolted together in a manner to provide an enclosure for a brake mechanism and a braking surface for engagement by radially movable sectional-type conical double faced brake shoes.

With the above and other ends in view the invention consists in matters hereinafter set forth and more particularly pointed out in the appended claims, reference being had to the accompanying drawings, in which Figure 1 is a vertical cross section through the present wheel hub illustrating a tire supporting rim mounted directly thereon by means of spokes;

Fig. 2 is a vertical cross section through the present type of hub illustrating a modified manner of mounting the tire supporting rim on the hub, and Fig. 3 is a modification embodying the same principle of hub construction.

Like characters of reference are employed throughout to designate corresponding parts.

In Figure 1, the numeral 1, indicates an axle having a bearing race 2 accommodating roller bearings 3, the latter being secured on the axle in any suitable manner. Spaced from the race 2 are provided a set of roller bearings 4. One section of the present hub brake drum is mounted on the bearings 3 and the other section is mounted on the bearings 4 and the two are bolted together in a manner to be described.

The section of the hub brake drum which is mounted on the bearings 3 is indicated by the numeral 5 and the section which is mounted on the bearings 4 is designated by the numeral 6. Each section is oppositely concaved relative to the other and the two sections are bolted together as at 7 by means of coinciding lugs formed on the outer periphery of each section through which bolts are passed. When bolted together the two sections are combined to form a substantially spherical or spheroidal shell. Each section is provided with angularly disposed annular surfaces 8 inside the same which serve as braking surfaces against which conical type brake shoes may be forced.

On the outside of each hub sections 5 and 6 and adjacent the braking surfaces are provided a plurality of ring like cooling and reinforcing fins 9.

A tire receiving rim 10 of the drop center type is secured on the hub formed by the two sections 5 and 6 by spokes 11 that are anchored in the reinforcing and cooling fins 9.

In Fig. 2 is illustrated a hub embodying front and rear side wall sections designated as 20 and 21 respectively, the sections being mounted on bearings 22 on an axle 23. Each section is formed with a radially extending portion 24 and with annular braking surfaces 25, the latter surfaces on opposite sections being angularly disposed in a manner to form a substantially conical seat for conical type brake shoes. On the front section 20 is formed a laterally projecting cylindrical portion 26 which is received in a piloting groove 27 in the rear section 21, the two sections being secured together by a series of bolts, one of which is indicated at 27'.

On the outer periphery of the cylindrical portion 26 is formed an angular seat portion 28 against which an oppositely inclined seat portion 29 on a rim 30 is forced by a wedge type screw threaded ring nut 31 that is received in a screw-threaded projection 32 on the front side wall section 20 to engage an angular seat 33 on the rim. A drop center rim 34 is secured to the rim 30 by spokes 35.

In the embodiment illustrated in Fig. 3 the front section 40 and the rear section 41 are formed with substantially radially extending portions 42 and opposed angular portions 43 serving as annular brake surfaces adapted to receive wedge type conical brake shoes. Each wall section has a cylindrical projection 44 which serves to space the two side wall members when the latter are bolted together as at 45. The cylindrical portion 44 on the rear section 41 is provided with an angular seat 46 against which an oppositely inclined seat 47 on a rim 48 is held by nuts 49 on two part bolts 50. A drop center or other type of tire supporting rim may be mounted on the rim 48 in the manner disclosed in Fig. 2 by means of spokes 51.

Although specific embodiments of the present invention have been illustrated and described it is to be understood that various changes may be made in the details of construction without departing from the spirit of the invention as set forth in the appended claims, and such changes are contemplated.

What I claim is:

1. A vehicle wheel comprising a hub formed of a pair of side wall members having portions adapted to receive axle bearings, said side members having oppositely inclined annular portions converging towards each other and contacting each Patented Apr. 21, 1936

2,037,742

UNITED STATES PATENT OFFICE 2,037,742

PHOTOGRAPHIC DEVELOPER

Frits E. Stockelbach, Montclair, N. J.

No Drawing. Application September 14, 1934,
Serial No. 744,018

15 Claims. (Cl. 95—88)

My present invention relates to photographic developers and aims to provide a new class of compounds adapted for such use.

In the developing of images on sensitized photographic surfaces which have been exposed to light, it is the general practice to immerse or treat such surfaces with an aqueous, slightly alkaline solution containing an organic reducing agent such as hydroquinone, pyrogallol, mono-methyl-p-aminophenol, glycine, etc. Of these developers pyrogallol is one of the oldest and is still considered generally satisfactory and much used by commercial photographers and by the motion picture industry. Pyrogallol, however, has a serious disadvantage in that it is readily oxidizable, and particularly so in alkaline solutions such as used in photographic work. It also has the tendency to impart a yellow tone to the finished negative and a yellow stain to the hands. The other developers aforementioned are also subject to various drawbacks; for example, some are expensive, others are unstable, and still others require great care in their use because of their too rapid action, or are inferior or undesirable for other reasons.

The present invention has for its object to provide a class of photographic developers which on the whole overcome the disadvantageous characteristics of the developers in general use at present and which are relatively stable in both neutral and alkaline solutions at summer heat temperatures, and therefore especially adapted for use in tropical countries; which will not stain the hands yellow or impart a yellow tone to the developed negative and which will be relatively inexpensive.

The class of compounds which possess these characteristics to a marked degree are the alkyl substituted pyro-gallols, for example, the mono substituted and the di-alkyl substituted pyrogallols such as mono ethyl pyrogallol, di-ethyl pyrogallol and mono tertiary butyl pyrogallol. The normal mono propyl pyrogallol also possesses certain of these characteristics to a marked degree but is not as soluble as the other alkyl substituted pyrogallols enumerated. All of these alkyl substituted pyrogallols are powerful reducing agents in both neutral and alkaline solution, do not tend to stain the hands or the negative yellow, and at temperatures of 85°–90° F. are comparatively stable even in alkaline solution.

A typical example of a developer using any of this class of alkyl derivatives of pyrogallol may be provided as follows:

Two solutions, A and B, are first prepared:

Solution A

| | |
|---|---|
| Sodium bisulphite | 50 grams |
| Alkyl substituted pyrogallol | 87.5 grams |
| Potassium bromide | 1.6 grams |
| Distilled water | 2100 cc. |

Solution B

| | |
|---|---|
| Anhydrous sodium carbonate | 110 grams |
| Anhydrous sodium sulphite | 153 grams |
| Distilled water | 2100 cc. |

150 cc. of solution A is added to 700 cc. of distilled water and 150 cc. of solution B is then mixed therewith. Using this resulting solution I have found that a correctly exposed plate or film develops completely at a temperature of 75°–85° F. within four or five minutes. To fix this developed plate or film it should be rinsed for thirty or forty seconds in distilled water acidified with a little glacial acetic acid, and thereafter treated in an acid fixing bath, after which the plate or film is washed in water to remove the adherent fixing salt.

Mono and di-ethyl pyrogallol are described in chemical literature and their method of preparation will not here be given. Mono tertiary butyl pyrogallol, as far as I am aware, is mentioned nowhere in chemical literature, and to the best of my knowledge and belief is a new compound. It may be prepared by condensing pyrogallol with tertiary butyl alcohol, using one of the usual condensing agents such as zinc chloride. After the condensation is completed the reaction product is shaken out with a solvent such as toluol, allowed to crystallize, and finally purified by distillation under high vacuum and crystallization from water. When crystallized from water it forms white crystals having a melting point of 138°–139.2° C. which are readily soluble in water and organic solvents.

When a drop of dilute ferric chloride is added to an aqueous solution of mono tertiary butyl pyrogallol it produces a light purple color which quickly disappears. If, following this, a drop of a dilute solution of sodium carbonate is added, a deep violet color is produced. A silver nitrate solution is reduced instantaneously by adding a few drops of the aqueous solution of mono tertiary butyl pyrogallol thereto.

Specifically, mono tertiary butyl pyrogallol may be prepared as follows:

In a flask provided with an agitator there are mixed 400 grams pyrogallol, 300 grams tertiary butyl alcohol and 300 grams fused zinc chloride, and the mixture heated with vigorous stirring. At 70° C. a vigorous reaction sets in accompanied by considerable foaming, at which point exterior cooling may be necessary. After the reaction has subsided the mixture is heated to 120° C. and maintained there for about an hour. The product is then cooled to room temperature, 300 c. c. of distilled water added thereto and the butyl pyrogallol extracted with ether. The ether extract is washed twice with 300 c. c. of water containing a few drops of hydrochloric acid and the ether is finally distilled off, the last traces thereof being removed under vacuum. The crude butyl pyrogallol is then purified by distillation under vacuum and boils at 165°–170° C. at 2 to 3 mm. pressure. The yield of distilled mono tertiary butyl pyrogallol will be approximately 500 grams. This distilled product may be further purified by crystallization from water in which when hot it is readily soluble, but when cold, only soluble to the extent of from 3%–4%.

Normal mono propyl pyrogallol is most readily prepared from the corresponding ketone 4-propionyl pyrogallol by reduction according to Clemmensen. When purified and crystallized, it forms crystals with a melting point 108–110° C. which are rather difficultly soluble in water but fairly soluble in organic solvents.

Although I have set forth but a few of the compounds of the general class to which my invention is applicable, and have given but a single type formula for a devolping solution, it is of course understood that the invention is not to be construed as limited by any of the examples given herein for illustrative purposes.

What I claim is:

1. A photographic developer comprising a solution of an alkyl substituted pyrogallol.
2. A photographic developer comprising a solution of a mono alkyl substituted pyrogallol.
3. A photographic developer comprising a solution of a di-alkyl substituted pyrogallol.
4. A photographic developer comprising a solution of an ethyl substituted pyrogallol.
5. A photographic developer comprising a solution of a mono ethyl substituted pyrogallol.
6. A photographic developer comprising a solution of a di-ethyl substituted pyrogallol.
7. A photographic developer comprising a solution of a mono tertiary butyl substituted pyrogallol.
8. A photographic developer comprising an aqueous alkaline solution of an alkyl substituted pyrogallol.
9. A photographic developer consisting of an aqueous alkaline solution of an alkyl substituted pyrogallol, an inorganic reducing agent and an alkali carbonate.
10. A photographic developer consisting of a solution comprising an alkyl substituted pyrogallol, sodium sulphite, potassium bromide and an alkali carbonate.
11. A process of developing images on sensitized photographic surfaces which have been exposed to light, which comprises subjecting said surfaces to the action of a solution containing an alkyl substituted pyrogallol.
12. A process of developing images on sensitized photographic surfaces which have been exposed to light, which comprises subjecting said surfaces to the action of a solution containing a mono ethyl pyrogallol.
13. A process of developing images on sensitized photographic surfaces which have been exposed to light, which comprises subjecting said surfaces to the action of a solution containing a di-ethyl pyrogallol.
14. A process of developing images on sensitized photographic surfaces which have been exposed to light, which comprises subjecting said surfaces to the action of a solution containing a mono tertiary butyl pyrogallol.
15. A process of developing images on sensitized photographic surfaces which have been exposed to light, which comprises subjecting said surfaces to the action of an alkaline aqueous solution containing an alkyl substituted pyrogallol.

FRITS E. STOCKELBACH.